United States Patent
Yoon et al.

(10) Patent No.: US 10,803,384 B2
(45) Date of Patent: Oct. 13, 2020

(54) ANOMALY DETECTION

(71) Applicant: MakinaRocks Co., Ltd., Seoul OT (KR)

(72) Inventors: Andre S. Yoon, Seoul (KR); Yongsub Lim, Gyeonggi-do (KR); Sangwoo Shim, Seoul (KR)

(73) Assignee: MAKINAROCKS CO., LTD., Seoul (KR)

( * ) Notice: Subject to any disclaimer, the term of this patent is extended or adjusted under 35 U.S.C. 154(b) by 0 days.

(21) Appl. No.: 16/133,467

(22) Filed: Sep. 17, 2018

(65) Prior Publication Data
US 2020/0019852 A1 Jan. 16, 2020

(30) Foreign Application Priority Data
Jul. 11, 2018 (KR) .................. 10-2018-0080482

(51) Int. Cl.
G06N 3/08 (2006.01)
G06N 20/00 (2019.01)
G06K 9/62 (2006.01)

(52) U.S. Cl.
CPC ............ *G06N 3/08* (2013.01); *G06K 9/627* (2013.01); *G06K 9/6256* (2013.01); *G06K 9/6262* (2013.01); *G06N 20/00* (2019.01)

(58) Field of Classification Search
CPC ........ G06N 3/08; G06N 20/00; G06K 9/6256; G06K 9/6262; G06K 9/627; G06K 9/6284
See application file for complete search history.

(56) References Cited

U.S. PATENT DOCUMENTS 9,454,958 B2 * 9/2016 Li ........................... G10L 15/16
2003/0061212 A1 3/2003 Smith et al.
(Continued)

FOREIGN PATENT DOCUMENTS

KR 20180027972 A 3/2018
KR 20180055708 A 5/2018
(Continued)

OTHER PUBLICATIONS

Lazarevic et al., "A Comparative Study of Anomaly Detection Schemes in Network Intrusion Detection", 2003, SDM 2003, pp. 1-12 (Year: 2003).*
(Continued)

*Primary Examiner* — Robert A Cassity
*Assistant Examiner* — Brent Johnston Hoover
(74) *Attorney, Agent, or Firm* — Innovation Capital Law Group, LLP; Vic Lin

(57) ABSTRACT

According to an exemplary embodiment of the present disclosure, disclosed is a computer program stored in a computer readable storage medium. When the computer program is executed in one or more processors, the computer program performs the following method for anomaly detection of data using a network function, and the method includes: generating an anomaly detection model including a plurality of anomaly detection sub models including a trained network function using a plurality of training data sub sets included in the training data set; calculating input data using at least one of the plurality of generated anomaly detection sub models; and determining whether there is an anomaly in the input data based on output data for input data of at least one of the plurality of generated anomaly detection sub models and the input data.

15 Claims, 9 Drawing Sheets

(56) References Cited

U.S. PATENT DOCUMENTS

2016/0342888 A1   11/2016   Yang et al.
2017/0024849 A1   1/2017    Liu et al.
2018/0174001 A1   6/2018    Kang

FOREIGN PATENT DOCUMENTS

KR   101863615   B1   6/2018
KR   20180075368  A   7/2018

OTHER PUBLICATIONS

Daniel B. Araya, et al., "An ensemble learning framework for anomaly detection in building energy consumption", Elsevier, Energy and Buildings 144 (2017), 191-206.
Shehroz S. Khan, et al., "Detecting Unseen Falls from Wearable Devices using Channel-wise Ensemble of Autoencoders", Mar. 24, 2017, Toronto Rehabilitation Institute, Canada, 25 pages.

\* cited by examiner

ANOMALY DETECTION

CROSS-REFERENCE TO RELATED APPLICATIONS

This application claims priority to and the benefit of Korean Patent Application No. 10-2018-0080482 filed in the Korean Intellectual Property Office on Jul. 11, 2018, the entire contents of which are incorporated herein by reference.

TECHNICAL FIELD

The present disclosure relates to a field of an artificial intelligence technology and more particularly, to anomaly detection utilizing an artificial intelligence technology.

BACKGROUND ART

As sensor data which is temporally used or stored in a database to be permanently used is accumulated, automated processing of monitoring data for many industrial apparatuses is being studied. In order to implement a data state determining method, an artificial intelligence technology using artificial neural network is being studied.

Even though a deep learning model which utilizes an artificial neural network provides a way to effectively learn a complex non-linear or dynamic pattern, when data to be processed is changed, there is a technical object to update the model. Korean Unexamined Patent Application Publication No. 10-2018-0055708 discloses an image processing method utilizing artificial intelligence.

SUMMARY OF THE INVENTION

The present disclosure has been made an effort to provide a data processing method utilizing artificial intelligence.

According to an aspect of the present disclosure, disclosed is a computer program stored in a computer readable recording medium. When the computer program is executed in one or more processors, the computer program performs the following method for anomaly detection of data using a network function and the method includes generating an anomaly detection model including a plurality of anomaly detection sub models including a trained network function using a plurality of training data sub sets included in the training data set; calculating input data using at least one of the plurality of generated anomaly detection sub models; and determining whether there is an anomaly in the input data based on output data for input data of at least one of the plurality of generated anomaly detection sub models and the input data.

As an alternative embodiment, each of the plurality of training data sub sets may include different training data which are grouped by a predetermined criterion and the predetermined criterion may include at least one of a generation time interval of the training data and a domain of the training data.

As an alternative embodiment, the plurality of anomaly detection sub models may include a first anomaly detection sub model including a first network function trained with the first training data sub set configured by training data generated during a first time interval and a second anomaly detection sub model including a second network function trained with the second training data sub set configured by training data generated during a second time interval which is different from the first time interval.

As an alternative embodiment, an initial weight of the second network function at least partially may share a weight of the trained first network function.

As an alternative embodiment, the first time interval may be earlier than the second time interval and the first anomaly detection sub model may be generated earlier than the second anomaly detection sub model.

As an alternative embodiment, the network function may be a network function including a dimensionality reduction network and a dimensionality restoration network.

As an alternative embodiment, the trained network function may be trained only with normal data which does not include an anomaly as training data and is trained to reduce and restore the dimensionality of the training data.

As an alternative embodiment, the calculating of input data using at least one of the plurality of generated anomaly detection sub models may includes generating output data obtained by generating dimensionality reduction data by reducing a dimensionality of the input data by a network included in the anomaly detection sub model and then restoring the dimensionality of the dimensionality reduction data.

As an alternative embodiment, the determining of whether there is an anomaly in the input data may include determining whether there is an anomaly in the input data, based on a reconstruction error calculated based on the comparison of the output data and the input data.

As an alternative embodiment, the method may further include: determining that there is an anomaly in the input data when all the plurality of anomaly detection sub models included in the anomaly detection model determines that there is an anomaly in the input data.

As an alternative embodiment, the determining of whether there is an anomaly in the input data may include determining whether there is an anomaly in input data using the second anomaly detection sub model; and determining whether there is an anomaly in input data using the first anomaly detection sub model when the second anomaly detection sub model determines that there is an anomaly in the input data.

As an alternative embodiment, a predetermined number of layers from layers close to an input layer among layers of a dimensionality reduction network of the second network function may set a weight of a corresponding layer of the first network function which is previously learned as an initial weight.

As an alternative embodiment, a predetermined number of layers from layers close to an input layer among layers of a dimensionality restoration network of the second network function may be initialized with a weight of a corresponding layer of the first network function which is previously learned at every learning epoch.

As an alternative embodiment, a first training data sub set configured by training data generated for the first time interval to generate the first anomaly detection sub model may be sampled at a lower sampling ratio than a sampling ratio of the second training data sub set for generating the second anomaly detection sub model so that only a part of the training data included in the first training data sub set is used to be trained.

According to another aspect of the present disclosure, disclosed is anomaly detecting method of data using a network function performed in one or more processors. The method includes: generating an anomaly detection model including a plurality of anomaly detection sub models including a trained network function using a plurality of training data sub sets included in the training data set;

calculating input data using at least one of the plurality of generated anomaly detection sub models; and determining whether there is an anomaly in the input data based on output data for input data of at least one among the plurality of generated anomaly detection sub models and the input data.

According to still another aspect of the present disclosure, disclosed is a computing device, The computing device includes: one or more processors; and a memory which stores commands executable in the processor in which the processor is configured to generate an anomaly detection model including a plurality of anomaly detection sub models including a trained network function using a plurality of training data sub sets included in the training data set; calculate input data using at least one of the plurality of generated anomaly detection sub models; and determine whether there is an anomaly in the input data based on output data for input data of at least one of the plurality of generated anomaly detection sub models and the input data.

The present disclosure provides a data processing method utilizing artificial intelligence.

BRIEF DESCRIPTION OF THE DRAWINGS

Various aspects will be described with reference to the drawings and like reference numerals collectively designate like elements. In the following exemplary embodiments, a plurality of specific details will be suggested for more understanding of one or more aspects for the purpose of description. However, it will be apparent that the aspect(s) will be embodied without having the specific details. In other examples, known structures and devices will be illustrated as a block diagram to easily describe the one or more aspects.

DETAILED DESCRIPTION

Figure 1:
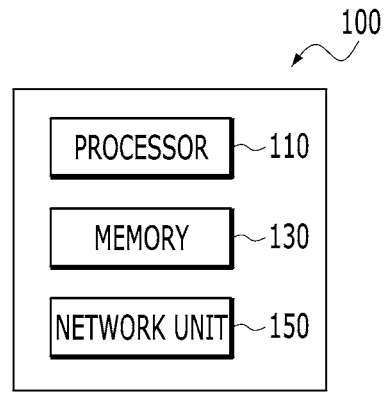
FIG. 1 is a block diagram of a computing device which detects an anomaly of data according to an exemplary embodiment of the present disclosure.

Various exemplary embodiments will now be described with reference to the drawings. In the specification, various descriptions are suggested to provide understanding of the present disclosure. However, it is obvious that the exemplary embodiments may be embodied without having the specific description.

Terms such as "component", "module", or "system" used in the specification indicate a computer-related entity, hardware, firmware, software, a combination of software and hardware, or execution of software. For example, a component may be a processing step which is executed in a processor, a processor, an object, an execution thread, a program and/or a computer, but is not limited thereto. For example, both an application which is executed in a computing device and a computing device may be a component. One or more components may be stayed within the processor and/or execution thread. One component may be localized in one computer. One component may be distributed between two or more computers. Such components may be executed from various computer readable media having various data structures stored therein. The components may communicate with each other through local and/or remote processings in accordance with a signal (for example, data transmitted through other system and a network such as Internet through data and/or a signal from one component which interacts with other component in a local system or a distributed system) having one or more data packets.

A term "or" is intended to refer to not exclusive "or", but inclusive "or". That is, when it is not specified or unclear on the context, "X uses A or B" is intended to mean one of natural inclusive substitutions. That is, when X uses A; X uses B; or X uses both A and B, "X uses A or B" may be applied to any of the above instances. Further, it should be understood that the term "and/or" used in this specification designates and includes all available combinations of one or more items among listed related items.

The term "comprise" and/or "comprising" is understood that the corresponding feature and/or component are present. However, it should be understood that a term "include" and/or "including" does not preclude existence or addition of one or more other features, constituent elements and/or a group of them. Further, when it is not separately specified or it is not clear from the context to indicate a singular form, the singular form in the specification and the claims is generally interpreted to represent "one or more".

Those skilled in the art will further appreciate that the various illustrative logical blocks, configurations, modules, circuits, means, logics, and algorithm steps described in connection with the embodiments disclosed herein may be implemented as electronic hardware, computer software, or combinations thoseof. To clearly illustrate the interchangeability of hardware and software, various illustrative components, blocks, configurations, means, logics, modules, circuits, and steps have been described above generally in terms of their functionality. Whether the functionality is implemented as hardware or software depends on a specific application and design constraints imposed on the overall system. Those skilled in the art may implement the described functionality in various ways for each of specific applications. However, decisions of such implementations should be interpreted without departing from the scope of the present disclosure.

Description of the suggested exemplary embodiments is provided to allow those skilled in the art to use or embody the present disclosure. Various modifications to these embodiments may be apparent to those skilled in the art. Generic principles defined herein may be applied to other embodiments without departing from the scope of the present disclosure. Therefore, the present disclosure is not limited to the embodiments suggested herein. The present disclosure needs to be interpreted within the broadest scope consistent with principles suggested herein and novel features.

In the present disclosure, a network function, an artificial neural network, and a neural network may be used to be exchangeable.

FIG. 1 is a view illustrating a block diagram of a computing device which performs a method of determining an anomaly of data according to an exemplary embodiment of the present disclosure. A configuration of the computing device 100 illustrated in FIG. 1 is just a simplified example. In an exemplary embodiment of the present disclosure, the computing device 100 may include other configurations for performing a computing environment of the computing device 100 or only some of the disclosed configurations may configure the computing device 100.

The computing device 100 may include a processor 110, a memory 130, and a network unit 150.

The processor 110 may be configured by one or more cores and may include a processor for data analysis or deep learning, such as a central processing unit (CPU) of a computing device, a general purpose graphics processing unit (GPGPU), and a tensor processing unit (TPU). The processor 110 reads a computer program stored in the memory 130 to perform an anomaly detecting method according to an exemplary embodiment of the present disclosure. According to an exemplary embodiment of the present disclosure, the processor 110 may perform an operation for learning of a neural network. The processor 110 may perform calculation for learning of the neural network, for example, processing of input data for learning in deep learning (DN), extraction of a feature from the input data, calculation of an error, and updating of a weight of the neural network using backpropagation. At least one of a CPU, a GPGPU, and a TPU of the processor 110 may process the learning of the network function. For example, both the CPU and the GPGPU may process the learning of the network function and data classification using the network function. Further, according to an exemplary embodiment of the present disclosure, processors of a plurality of computing devices are used together to process the learning of the network function and data classification using the network function. Further, the computer program executed in the computing device according to the exemplary embodiment of the present disclosure may be a CPU, GPGPU, or TPU executable program.

The computing device 100 according to the exemplary embodiment of the present disclosure may distribute and process the network function using at least one of the CPU, the GPGPU, and TPU. Further, the computing device 100 according to the exemplary embodiment of the present disclosure may distribute and process the network function together with the other computing device. A detailed description of a network function distribution processing of the computing device 100 will be specifically discussed in U.S. patent application Ser. No. 15/161,080 (filed on May 20, 2016) and U.S. Ser. No. 15/217,475 (filed on Jul. 22, 2016) which are incorporated by reference herein in its entirety.

Data which is processed using a network function in an exemplary embodiment of the present disclosure may include all kinds of data acquired in industrial field. For example, an operation parameter of device for producing products during a production process of products and sensor data acquired by the operation of the device may be included. For example, temperature setting of equipment during a specific process and a wavelength of laser in a process using laser may be included as the type of data processed in the present disclosure. For example, data to be processed may include lot equipment history data from a management execution system (MES), data from an equipment interface data source, processing tool recipes, processing tool test data, probe test data, electrical test data, fault measurement data, diagnostic data, remote diagnostic data, and post-processing data, but the present disclosure is not limited thereto. As a more specific example, the data to be processed may include work-in-progress information including approximately 120,000 items per lot acquired in a semiconductor fab, raw processing tool data, equipment interface information, process metrology information (for example, including 1000 items per lot), fault information which a yield related engineer may access, operation test information, and sort information (including datalog and bitmap), but the present disclosure is not limited thereto. Description of the above-described type of data is only an example and the present disclosure is not limited thereto. Also, in one embodiment of the present disclosure, the data processed using the network function may comprise a human bio-signal. The human bio-signal may include, for example, an electrocardiogram signal, body temperature, blood pressure, pulse, and the like, but the present disclosure is not limited thereto. Also, in one embodiment of the present disclosure, the data processed using the network function may include engineer-recorded data (e.g., job log, etc.). In the exemplary embodiment of the present disclosure, the computing device 100 may perform pre-processing on the collected data. The computing device 100 may supplement a missing value in the collected data. The computing device 100 may supplement the missing value with a median value or an average or delete a column with a plurality of missing values. Further, for example, the computing device 100 may utilize a subject matter expertise of the manager to pre-process data by a matrix completion computing device 100. For example, the computing device 100 may remove values (for example, a value which is estimated as an erroneous operation of a sensor) which are completely deviated from a boundary and a limit from the collected data. Further, the computing device 100 may adjust a value of data to allow the data to have a similar scale while maintaining a characteristic. For example, the computing device 100 may apply a column-unit standardization of data. The computing device 100 may remove heat which is irrelevant to the anomaly detection from the data to simplify the processing. According to the exemplary embodiment of the present disclosure, the computing device 100 may perform an appropriate input data pre-processing method for easiness of the learning of a network function for generating an anomaly detection model and anomaly detection. Description of specific examples of a type, an example, pre-processing, and conversion of the input data has been specifically discussed in U.S. patent application Ser. No. 10/194,920 (filed on Jul. 12, 2002) which is incorporated by reference herein in its entirety.

Data which is processed in the exemplary embodiment of the present disclosure may include image data and may be data stored in a storage medium of the computing device 100, images photographed by a camera (not illustrated) of the computing device 100 and/or images transmitted from other computing device such as an image database, by a network unit 150. Further, according to an exemplary embodiment of the present disclosure, the image processed using a network function may be an image stored in a computer readable storage medium (for example, including a flash memory, but the present disclosure is not limited thereto). The computing device 100 may receive an image file stored in the computer readable storage medium through an input/output interface (not illustrated).

The processor 110 may generate an anomaly detection model including a network function. The processor 110 trains the network function using a training data set to generate an anomaly detection model for detecting an anomaly of data. The training data set may include a plurality of training data sub sets. The plurality of training data sub sets may include different training data which are grouped by predetermined criteria. According to an exemplary embodiment of the present disclosure, the predetermined criteria for grouping the plurality of training data sub sets may include at least one of a training data generation time interval and a domain of training data. The domain of the training data may include information which becomes a criterion for distinguishing one group of training data from the other group. For example, the training data of the present disclosure may be sensor data acquired during a semiconductor producing process and an operation parameter of producing equipment. In this case, when a setting (for example, the change of a wavelength of laser which is irradiated during a specific process) of the producing equipment is changed during the semiconductor producing process (that is, a recipe is changed), sensor data acquired after changing the setting may be included in a training data sub set which is different from sensor data acquired before changing the setting. In the normal producing process, the type of normal data may be plural due to the change of the manufacturing method in accordance with the elapse of time. According to an exemplary embodiment of the present disclosure, each training data sub set may include training data which is grouped by a criterion in accordance with the change of the manufacturing method. According to an exemplary embodiment of the present disclosure, in the case of the semiconductor producing process, different normal data per recipe may be acquired. That is, data which is acquired in the producing process operated by different recipes are different, but all the data is normal data. According to an exemplary embodiment of the present disclosure, a plurality of training data sub sets may include different types of training data. The plurality of training data sub sets may be grouped by a predetermined criterion (for example, a generation time interval, a domain, or a recipe in the process). Further, the plurality of training data subsets may be grouped using the generated anomaly detection sub model. For example, when the input data includes a new pattern as a result obtained by processing input data by the trained anomaly detection sub model, the input data including a new pattern may configure a different training data sub set. The plurality of training data sub sets may be grouped by the anomaly detection sub model. According to an exemplary embodiment of the present disclosure, each training data sub set may be grouped by the anomaly detection sub model. For example, even though the recipe is changed in the process, when input data (sensor data acquired by the process generated after changing the recipe) generated after changing the recipe is not determined as a new pattern by the existing anomaly detection sub model (that is, it does not have a novelty which is equal to or higher than a threshold value), the input data generated before and after changing the recipe may be grouped into one training data sub set. Further, for example, when the input data generated after changing the recipe in the process is determined as a new pattern by the anomaly detection sub model, the input data generated before changing the recipe and the input data generated after changing the recipe may be grouped into different training data sub sets. That is, even though input data having a new pattern may be data including an anomaly, when there is a plurality of input data having a new pattern, the input data having a new pattern may be new normal data. When there are one or more pieces of input data having a new pattern, the input data having a new pattern may be data including an anomaly or new normal data. Therefore, when the input data having a new pattern is new normal data, the processor 110 may classify the input data into separate training data sub sets. Description of the above-described training data is only an example and the present disclosure is not limited thereto.

The processor 110 may generate an anomaly detection model including a plurality of anomaly detection sub models including a network function which is previously trained using a plurality of training data sub sets included in the training data set. According to an exemplary embodiment of the present disclosure, the training data sub set may be configured by normal data and the learning of the exemplary embodiment of the present disclosure may be semi supervised learning. According to an exemplary embodiment of the present disclosure, the anomaly detection model may include a plurality of anomaly detection sub models and each of the plurality of anomaly detection sub models may be a sub model which is learned using the training data sub set. Each anomaly detection sub model may include one or more network functions. The anomaly detection model according to an exemplary embodiment of the present disclosure includes the anomaly detection sub model which is learned using each training data sub set so that anomaly of several types of data may be detected.

The plurality of anomaly detection sub models may include a first anomaly detection sub model including a first network function learned by a first training data sub set configured by training data generated during a first time interval and a second anomaly detection sub model including a second network function previously learned by a second training data sub set configured by training data generated during a second time interval which is different from the first time interval. For example, the training data sub set of the present disclosure may be grouped in accordance with the generation time interval of the training data. For example, when the recipe is changed at every six months during the semiconductor process, the training data generated for six months may configure one training data sub set. Description of the above-described semiconductor process is only an example and the present disclosure is not limited thereto. The processor 110 trains the network function of the anomaly detection sub model using each training data sub set to generate an anomaly detection sub model. When the recipe is changed after generating the first anomaly detection sub model including the first network function learned by the first training data sub set, the processor 110 may generate the second anomaly detection sub model including the second network function learned by the second training data sub set. The first training data sub set and the second training data sub set may include data acquired by the producing process operated by different recipes. Here, an initial weight of the second network function may at least partially share a weight of the first network function which is trained. Here, the first time interval may be earlier than the second time interval. Therefore, the first anomaly detection sub model may be a model which is generated earlier than the second anomaly detection sub model. After generating the first anomaly detection sub model, in order to generate the second anomaly detection sub model based on the recipe change, the processor 100 reuses a part of knowledge obtained from the first anomaly detection sub model by utilizing a part of the first anomaly detection sub model for a part of the second anomaly detection sub model to update the model. According to an exemplary embodiment of the present disclosure, when a next sub model is generated, a part of previous model is used so that the knowledge learned from the previous model is not forgotten and led to a next model so that a performance of next model may be increased and an overall learning time may be reduced. The processor 110 stores the anomaly detection sub models after generating each anomaly detection sub model using each training data sub set to generate an anomaly detection model.

Among layers of the second network function, a predetermined number of layers set a weight of a corresponding layer of the trained first network function as an initial weight.

A predetermined number of layers from layers close to an input layer among layers of a dimensionality reduced network of the second network function sets a weight of a corresponding layer of the first network function which is trained as an initial weight. A predetermined number of layers from the input layer of the second network function may be learned with a weight of the latest network function as an initial weight. The processor 110 may train the second network function with an initial weight of some layers close to an input layer of newly learned second network function as a weight of a first network function which is already learned. The weight is shared as described above so that a computational amount required to train the second network function may be reduced. That is, by setting the initial weights of the predetermined number of layers close to the input layer of the second network function as weight of the trained network function, rather than the random network function, the knowledge of the trained network function may be utilized to extract (dimensionality reduction) a feature of the input data. Further, the second network function may complete the learning by learning only the restoration (dimensionality restoration) of the input data by the feature so that a time and a computational amount required for entire learning may be reduced.

A predetermined number of layers from layers close to an output layer among layers of a dimensionality reduced network of the second network function sets a weight of a corresponding layer of the first network function which is previously learned as an initial weight. A predetermined number of layers from the output layer of the second network function may be learned with a weight of the latest network function as an initial weight. The processor 110 may train the second network function with an initial weight of some layers close to an output layer of newly learned second network function as a weight of a first network function which is already learned. The weight is shared as described above so that a computational amount required to train the second network function may be reduced. That is, the initial weight of the predetermined number of layers close to the output layer of the second network function is set as a weight of a network function which is not random, but is trained so that the knowledge of the trained network function is utilized to restore the dimensionality of the input data. The second network function may learn only the dimensionality reduction of the input data by the feature to complete the learning so that the time and a computational amount required for entire learning may be reduced.

A predetermined number of layers of the second network function may be initialized to be a weight of a corresponding layer of the trained first network function at every learning epoch.

A predetermined number of layers from an output layer among dimensionality restoration layers of the second network function may be initialized to be a weight of a corresponding layer of the trained first network function at every learning epoch. The processor 110 may initialize the weight of the predetermined number of layers close to the output layer during the learning of the second network function may be initialized by the weight of a corresponding layer of the trained network function at every learning epoch. In this case, a weight of the dimensionality restoration layer of the second network function may be changed at one learning epoch, which may affect the learning of the dimensionality reduction layer. Through the above operations, the processor 110 fixes the weight of the dimensionality restoration network of the second network function and train only the dimensionality reduction network (a feature extracting network), so that a time and a computational amount for the learning of the second network function are reduced and the knowledge of the previous learning may be utilized.

A predetermined number of layers from an input layer among dimensionality reduction layers of the second network function may be initialized to be a weight of a corresponding layer of the trained first network function at every learning epoch. The processor 110 may initialize the weight of the predetermined number of layers close to the input layer during the learning of the second network function may be initialized by the weight of a corresponding layer of the trained network function at every learning epoch. In this case, a weight of the dimensionality reduction layer of the second network function may be changed at one learning epoch, which may affect the learning of the dimensionality restoration layer. Through the above-described operation, the processor 110 fixes the weight of the dimensionality reduction network of the second network function and train only the dimensionality restoration network, so that the time and the computational amount for the learning of the second network function are reduced and the knowledge in the previous learning may be utilized.

A predetermined number of layers of the second network function may be fixed to a weight of a corresponding layer of the trained first network function.

A predetermined number of layers from an output layer among dimensionality restoration layers of the second network function may be fixed to a weight of a corresponding layer of the trained first network function. A predetermined number of layers from an input layer among dimensionality reduction layers of the second network function may be fixed to a weight of a corresponding layer of the trained first network function. The processor 110 train only some layers of the second network function by fixing the weight so that the time and the computational amount for the learning of the second network function are reduced and the knowledge in the previous learning may be utilized.

A second anomaly detection sub model may be trained by training data sub sets (that is, training data generated by a process with a recipe which is different from the training data which trains the first network function) which are different from the training data sub set which learns the first anomaly detection sub model. Further, the second anomaly detection sub model may be learned by all the training data sub set which learns the first anomaly detection sub model and the training data sub set (that is, training data generated by the process with a recipe different from the training data which learns the first anomaly detection sub model) corresponding to the second anomaly detection sub model. Since the second anomaly detection sub model is trained with training data including the training data sub model which learns the previous anomaly detection sub model, the second anomaly detection sub model may inherit the knowledge learned in the first anomaly detection sub model. In this case, in the training data which learning the second anomaly detection sub model, a sampling ratio of the second training data sub set and the first training data sub set (that is, a training data sub set which learns the previous sub model) may be different. The first training data sub set configured by the training data generated during a first time interval to generate a first anomaly detection sub model may be sampled at a lower sampling ratio than a sampling ratio of the second training data sub set for generating the second anomaly detection sub model to use only some of the training data included in the first training data sub set to train. Even though the first training data sub set may be used to train the second anomaly detection sub model, in this case, the first training data sub set may be sampled at a sampling ratio lower than the second training data sub set. That is, the training data sub set which is used to train the previous anomaly detection sub model may be used for the learning of the next anomaly detection sub model. However, in this case, the training data sub set may be sampled at a different ratio from the training data sub set for learning the next anomaly detection sub model to be used for the learning. In order to train the anomaly detection sub model, not only the current training data sub set, but also the past training data sub set may be used so that the anomaly detection sub model may ensure the processing performance for the past data (for example, before changing the process or the recipe) so that it is free from the problem of forgetting the model update. In the learning of the second anomaly detection sub model, an importance of the first training data sub set is different from an importance of the second training data sub set so that the second anomaly detection sub model may be learned with the second training data sub set which is the latest training data by applying a higher weight than that of the first training data sub set thereto. For example, when each training data sub set includes 100000 data, the second anomaly detection sub model may be learned through all data of the second training data sub set (that is, 100000 training data) and some data of the first training data sub set (for example, 10000 training data). The difference of the number of training data and the sampling ratio described above is only an example and the present disclosure is not limited thereto. As described above, in order to generate the anomaly detection sub model, a sub set of the training data used to generate a past anomaly detection sub model is used but the sampling ratio of the current training data and the past training data is changed. Therefore, the anomaly detection sub model is trained to put a higher weight to the current training data so that the forgetting of the knowledge learned in the past anomaly detection sub mode may be minimized while increasing a processing performance for data (for example, data after changing a process or recipe or data having a different domain) different from the anomaly detection sub model learned with the past data.

In the present disclosure, the trained network function may be learned only with normal data which does not include an anomaly as training data. In the present disclosure, the trained network function may be learned to reduce and restore the dimensionality of the training data. In the present disclosure, the network function may include an auto encoder which is capable of reducing the dimensionality of the input data and restoring the dimensionality. Further, the network function of the present disclosure may include an arbitrary network function which is operable to generate the input data as an output. For example, the network function of the present disclosure may include an auto encoder which is capable of restoring input data, generative adversarial network (GAM) which generates an output similar to the input data, a U-network, and a network function configured by a combination of a convolutional network and a deconvolutional network. That is, the network function of the present disclosure is learned to output output data close to the input data and is learned only with the normal data so that when the input data is normal data which does not include an anomaly, the output data may be similar to the input data. When anomaly data is input to the network function of the present disclosure, the network function of the present disclosure is not trained for restoring an anomaly pattern so that the output data may not be similar to the input data as compared with the output when the normal data is input. That is, the trained network function of the present disclosure may detect a novelty for an anomaly pattern which is not learned in the input data and the novelty may be represented as a reconstruction error of the output data with respect to the input data. When the reconstruction error exceeds a predetermined threshold value, the processor 110 determines that the input data includes a pattern which is not learned (that is, anomal pattern) to detect that the input data includes an anomaly.

The processor 110 may calculate the input data using at least one of the plurality of generated anomaly detection sub models. The processor 110 may calculate the input data using the latest anomaly detection sub model among the plurality of generated anomaly detection sub models. The processor 110 may calculate the input data using the latest anomaly detection sub model among the plurality of anomaly detection sub models and may also calculate the input data using an anomaly detection sub model which is gradually generated in the past from the latest anomaly detection sub model. The input data may include image data of a product acquired during the producing process, an operation parameter which operates devices of the producing process, and sensor data acquired during the producing process, but the present disclosure is not limited thereto. During the producing process, the processor 110 may perform an operation of modifying the input data to data which is different from the input data using the anomaly detection sub model and then restoring the input data. The processor 110 may calculate to reduce a dimensionality of the input data using the anomaly detection sub model and restore the dimensionality to generate an output which is similar to the input data. The processor 110 extracts a feature from the input data using the anomaly detection sub model and restores the input data based on the feature. As described above, a network function included in the anomaly detection sub model of the present disclosure may include a network function which is capable of restoring the input data so that the processor 110 calculates the input data using the anomaly detection sub model to restore the input data. According to another exemplary embodiment of the present disclosure, the anomaly detection sub model may include a plurality of network functions and in this case, the processor 110 may input the input data to the plurality of network functions to perform the calculation.

The processor 110 may determine whether there is an anomaly in the input data, based on output data and input data for at least one input data among the plurality of anomaly detection sub models. As described above, the anomaly detection sub model according to the exemplary embodiment of the present disclosure may learn a pattern of the normal data with the normal data as training data and learn to output output data which is similar to the input data. Therefore, according to an exemplary embodiment of the present disclosure, the processor 110 may calculate a reconstruction error of the output data by comparing the output data and the input data of the anomaly detection sub model. The processor 110 may detect that the input data includes a new pattern which is not learned by the trained anomaly detection sub model based on an reconstruction error. When the dimensionality of novelty (that is, a size of the reconstruction error) is equal to or higher than a predetermined threshold value, the processor 110 may determine that the input data includes a new pattern which is not learned. The anomaly detection sub model is trained with the normal data as training data so that a new pattern which is not learned may be an anomaly. When the input data includes a new pattern which is not leaned, the processor 110 may determine that the input data is anomaly data including an anomaly. According to another exemplary embodiment of the present disclosure, the anomaly detection sub model may include a plurality of network functions and the processor 110 calculates a reconstruction error of the output data by comparing the output data of the plurality of network functions with input data to determine whether a new pattern is included in the input pattern. In this case, the processor 110 ensembles the plurality of network functions included in each anomaly detection sub model to determine whether a new pattern is included in the input data. For example, the processor 110 compares output and input data of the plurality of network functions included in each anomaly detection sub model and calculate a reconstruction error to deduce a plurality of reconstruction errors and combines the plurality of reconstruction errors to determine whether a new pattern is included in the input data.

When it is determined that the new pattern is included in the input data using the anomaly detection sub model, the processor 110 may determine whether a new pattern is included in the input data using an anomaly detection sub model which is generated earlier than the anomaly detection sub model. The processor 110 may determine whether there is a new pattern in the input data using a second anomaly detection sub model. The processor 110 may determine whether there is a new pattern (for example, anomaly or another normal pattern) which is not learned in the second anomaly detection sub model in the input data based on the reconstruction error of the output data and the input data, using the second anomaly detection sub model. When the processor 110 determines that there is a new pattern in the input data using the second anomaly detection sub model, the processor 110 may additionally determine whether there is an anomaly in the input data using the first anomaly detection sub model. That is, when it is determined that there is a new pattern in the input data using the latest anomaly detection sub model, the processor 110 may determine whether there is a new pattern in the input data using a previous anomaly detection sub model. For example, when the recipe is changed in the semiconductor process, even though it is determined that there is a new pattern in the input data in the determination using an anomaly detection sub model learned with the latest training data, it may be determined that there is no new pattern in the input data in the determination using a past anomaly detection sub model. Even though the input data may be determined to be the anomaly in the latest anomaly detection sub model, for example, when the recipe is changed in the process and when the input data is sensor data acquired during the process produced by a previous recipe, the corresponding input data may be normal in the previous recipe. In this case, the processor 110 may determine the input data as normal data. When all the plurality of anomaly detection sub models included in the anomaly detection model determines that there is an anomaly in the input data, the processor 110 may determine that there is an anomaly in the input data. Therefore, in the exemplary embodiment of the present disclosure, the processor 110 detects the anomaly of the input data using the plurality of anomaly detection sub models learned using a plurality of training data sub sets to determine whether there is an anomaly in the input data corresponding to various recipes. For example, in the case of the manufacturing process which is changed at every six months, the plurality of anomaly detection sub models of the exemplary embodiment of the present disclosure may be sub models leaned with the training data corresponding to the changes of the manufacturing process. In this case, the anomaly detection model may determine whether there is an anomaly of the input data using the anomaly detection sub model corresponding to each manufacturing process. Even though it is determined that there is an anomaly in the input data by the anomaly detection sub model generated with the latest training data, when it is determined that there is no anomaly in the past anomaly detection sub model, the input data may be determined as normal sensor data which is generated not by the latest process, but by the previous process. When all the plurality of anomaly detection sub models included in the anomaly detection model determines that there is an anomaly in the input data, the processor 110 may determine that there is an anomaly in the input data. Further, according to the exemplary embodiment of the present disclosure, it is possible to determine whether the product is a normal product of the current process or a previous process by means of the anomaly determining method. Therefore, the anomaly determining performance may be maintained in accordance with the change of the process.

The anomaly determining method according to an exemplary embodiment of the present disclosure determines whether there is an anomaly in data using an anomaly detection model including an anomaly detection sub model learned using a plurality of training data sub sets, so that it is possible to minimize the forgetting of the information learned in the previous model and it may be determined that there is an anomaly in the input data generated corresponding to a plurality of processes in accordance with the change of the process in the industrial field. The model is configured by storing a sub model learned by train the sub model by the training data grouped by predetermined criteria so that consumption of the computing resources (for example, problems of learning difficulties such as a problem of a storage space, a problem of a computational amount, and overfitting) may be reduced as compared with a case in which the model is trained with all training data accumulated so as not to forget the trained knowledge.

Figure 2:
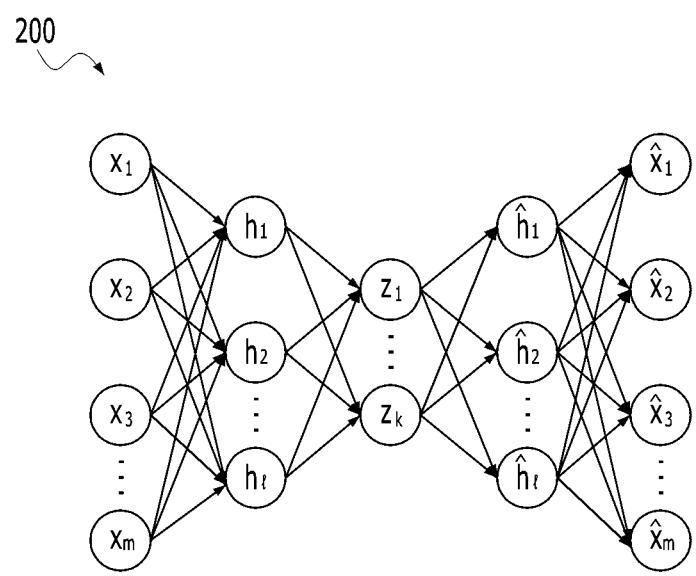
FIG. 2 is a schematic view illustrating a network function according to an exemplary embodiment of the present disclosure.

FIG. 2 is a schematic view illustrating a network function 200 according to an exemplary embodiment of the present disclosure.

Throughout the specification, an operation model, a network function, and a neural network may be used to have the same meaning. The neural network may generally be configured by a set of interconnected calculating units which may be referred to as "nodes". The "nodes" may also be referred to as "neurons". The neural network is configured to include at least one node. The nodes (or neurons) which configure the neural networks may be connected to each other by one or more "links".

In the neural network, one or more nodes connected through the link may relatively form a relation of an input node and an output node. Concepts of the input node and the output node are relative so that an arbitrary node which serves as an output node for one node may also serve as an input node for the other node and vice versa. As described above, an input node to output node relationship may be created with respect to the link. One or more output nodes may be connected to one input node through the link and vice versa.

In the input node and output node relationship connected through one link, a value of the output node may be determined based on data input to the input node. The node which connects the input node and the output node to each other may have a weight. The weight may be variable and may vary by the user or the algorithm to allow the neural network to perform a desired function. For example, when one or more input nodes are connected to one output node by each link, the output node may determine an output node value based on values input to the input nodes connected to the output node and a weight set to the link corresponding to the input nodes.

As described above, in the neural network, one or more nodes are connected to each other through one or more links to form an input node and output node relationship in the neural network. In the neural network, a characteristic of the neural network may be determined in accordance with the number of the nodes and links and a correlation between the nodes and links, and a weight assigned to the links. For example, when there are two neural networks in which the same number of nodes and links are provided and weights between links are different, it may be recognized that the two neural networks are different.

The neural network may be configured to include one or more nodes. Some of the nodes which configure the neural network may configure one layer based on distances from the initially input nodes. For example, a set of nodes whose distance from the initially input node is n may configure n layers. The distance from the initially input node may be defined by a minimum number of links which need to go through to reach from the initially input node to the corresponding node. However, the definition of the layer is arbitrary provided for description and the dimensionality of the layer in the neural network may be defined differently from the above description. For example, the layer of the nodes may be defined by a distance from the finally output node.

The initially input node may refer to one or more nodes to which data is directly input without passing through the link in the relationship with other nodes, among the nodes in the neural network. Alternatively, in the neural network, in the relationship between nodes with respect to the link, the initially input node may refer to nodes which do not have other input nodes linked by the link. Similarly, the final output node may refer to one or more nodes which do not have an output node, in the relationship with other nodes, among the nodes in the neural network. Further, a hidden node may refer to nodes which configure the neural network, other than the initially input node and the finally output node. In the neural network according to an exemplary embodiment of the present disclosure, the number of nodes of the input layer may be equal to the number of nodes of the output layer and the number of nodes is reduced and then increased from the input layer to the hidden layer. Further, in the neural network according to another exemplary embodiment of the present disclosure, the number of nodes of the input layer may be smaller than the number of nodes of the output layer and the number of nodes is reduced from the input layer to the hidden layer. Further, in the neural network according to another exemplary embodiment of the present disclosure, the number of nodes of the input layer may be larger than the number of nodes of the output layer and the number of nodes is increased from the input layer to the hidden layer. The neural network according to another exemplary embodiment of the present disclosure may be a neural network obtained by the combination of the above-described neural networks.

A deep neural network (DNN) may refer to a neural network including a plurality of hidden layers in addition to the input layer and the output layer. When the deep neural network is used, latent structures of the data may be identified. That is, it is possible to identify latent structures of photos, texts, video, audio, and music (for example, which objects are in the photo, what is the content and the emotion of the text, and what is the content and the emotion of the audio). The deep neural network may include a convolutional neural network (CNN), a recurrent neural network (RNN), auto encoder, a generative adversarial network (GAN), a restricted boltzmann machine (RBM), a deep belief network (DBN), a Q network, a U network, and a Siamese network. Description of the above-described deep neural networks is only an example and the present disclosure is not limited thereto.

According to an exemplary embodiment of the present disclosure, the network function 200 may include an auto encoder. The auto encoder may be a sort of an artificial neural network to output output data which is similar to the input data. The auto encoder may include at least one hidden layer and an odd number of hidden layers may be disposed between input and output layers. The number of nodes in each layer may be reduced from the number of nodes of the input layer to be an intermediate layer called a bottleneck layer (encoding) and then expand from the bottleneck layer to the output layer (is symmetrical to the input layer) to be symmetrical to the reduction. In this case, in the example of FIG. 2, it is illustrated that the dimensionality reduction layer and the dimensionality restoration layer are symmetrical to each other, but the present disclosure is not limited and the nodes of the dimensionality reduction layer and the dimensionality restoration layer may be symmetrical to each other or not. The auto encoder may perform non-linear dimensionality reduction. The number of input layers and output layers may correspond to the number of remaining sensors after the pre-processing of the input data. In the auto encoder structure, the number of nodes of the hidden layer included in the encoder is reduced as the distance from the input layer increases. When the number of nodes of the bottle neck layers (a layer having the smallest number of nodes located between the encoder and a decoder) is too small, sufficient amount of information may not be transmitted. Therefore, the node may be maintained to be a certain number or more (for example, a half or more of the input layer).

The neural network may be learned by at least one of supervised learning, unsupervised learning, and semi supervised learning methods. The learning of the neural network is to minimize an error of the output. Training data is repeatedly input to the neural network during the learning of the neural network, an output of the neural network for the training data and an error of the target are calculated, and an error of the neural network is back-propagated from the output layer of the neural network to the input layer direction so as to reduce the error to update a weight of each node of the neural network. In the case of the supervised learning, training data (that is, labeled training data) labeled with a correct answer is used for each training data, but in the case of the unsupervised learning, the correct answer may not be labeled to each training data. That is, for example, the training data of the supervised learning for data classification may be training data labeled with category. The labeled training data is input to the neural network and the error may be calculated by comparing the output (category) of the neural network and the label of the training data. As another example, in the case of the unsupervised learning for data classification, an error may be calculated by comparing the training data which is an input with the neural network output. The calculated error is backpropagated to a reverse direction (that is, a direction from the output layer to the input layer) in the neural network and a connection weight of each node of each layer of the neural network may be updated in accordance with the backpropagation. A variation of the connection weight of the nodes to be updated may vary depending on a learning rate. The calculation of the neural network for the input data and the backpropagation of the error may configure a learning epoch. The learning rate may be differently applied depending on the repetitive number of the learning epochs of the neural network. For example, at the beginning of the neural network learning, the neural network quickly ensures a predetermined level of performance using a high learning rate to increase efficiency and at the late stage of the learning, the low learning rate is used to increase the precision.

In the learning of the neural network, normally, the training data may be a sub set of the actual data (that is, data to be processed using the learned neural network). Therefore, there may be a learning epoch that the error of the training data is reduced and the error is increased for the actual data. The overfitting is a phenomenon in which the training data is excessively learned so that an error for real data is increased. For example, a phenomenon that a neural network that learns a cat by showing a yellow cat does not recognize a cat other than the yellow cat as a cat may be a sort of overfitting. The overfitting may act as a cause of the increase of the error of the machine learning algorithm. In order to prevent the overfitting, various optimization methods may be used. In order to prevent the overfitting, a method of increasing training data, regularization, or a dropout method which omits some nodes of the network during the learning process may be applied.

Figure 3:
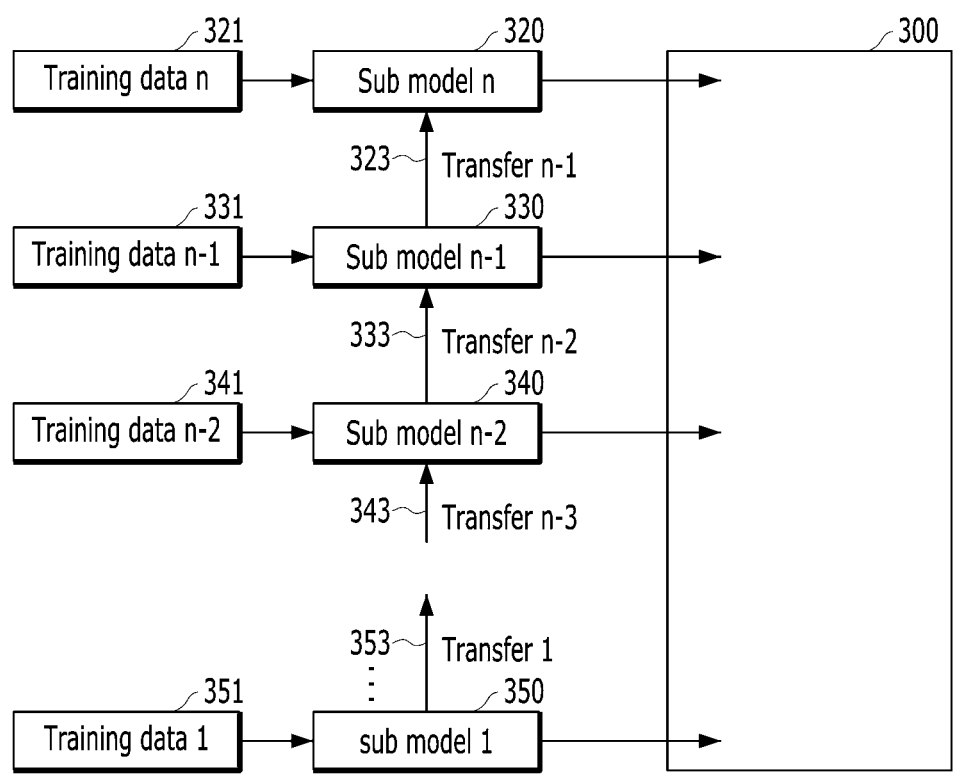
FIG. 3 is a schematic view illustrating a process of generating an anomaly detection model according to an exemplary embodiment of the present disclosure.

FIG. 3 is a schematic view illustrating a process of generating an anomaly detection model according to an exemplary embodiment of the present disclosure.

The training data 321, 331, 341, and 351 may include a plurality of sub sets. The plurality of sub sets of the training data may be grouped by a predetermined criterion. The predetermined criterion may include an arbitrary criterion which distinguishes the training data included in the training data sub set from training data included in other training data sub set. For example, the predetermined criterion may include at least one of a generation time interval of the training data and a domain of training data. According to another exemplary embodiment of the present disclosure, when the training data is grouped by the generation time interval of the training data, a plurality of normal patterns may be included in one training data sub set. For example, when the training data generated for six months is configured by one sub set, one sub set may include training data (that is, a plurality of normal patterns) generated by two or more recipes. In this case, one anomaly detection sub model may learn the plurality of normal patterns and may be used to detect anomalies (for example, to detect a novelty) for the plurality of normal patterns. Further, according to another exemplary embodiment of the present disclosure, the training data generated by one recipe and the input data may have a plurality of normal patterns. In this case, the training data generated by one recipe may be configured by one training data sub set including a plurality of normal patterns with respect to one recipe or the training data sub set may be configured for every normal pattern. The training data generated by one recipe and the input data may have one normal pattern or a plurality of normal patterns. Further, for example, the sub set of the training data may be grouped depending on whether to include a new pattern by the trained anomaly detection sub model. For example, the generation time interval of the training data may be a time interval having a predetermined size or a time interval having different sizes. For example, when the recipe is changed at every month during the producing process, the generation time interval of the training data which distinguishes the sub set of the training data may be six months. Further, for example, the size of the time interval may be set such that the number of training data included in the sub set of the training data is equal to each other. For example, when the number of training data acquired when an operating rate of the producing process is 50% may be half of the number of training data acquired when an operating rate of the producing process is 100%. In this case, when the training data is collected for three months in the process in which the operating ratio of the production process is 100% to configure one training data sub set, the training data may be collected for six months in the process in which the operating ratio of the production process is 50% to configure one training data sub set. The generation time interval for distinguishing the training data sub set may be set by a manager. In another exemplary embodiment of the present disclosure in which training data used to train the previous anomaly detection sub model is reused to train the anomaly detection sub model, in order to train the anomaly detection sub model to be more fitted to the latest training data, the latest the training data sub set, the larger the size of the time interval for distinguishing the training data sub set (that is, a large number of latest training data may be included in the training data set for learning). For example, when the training data sub set which trains the previous sub model is sensor data accumulated for three months, the training data sub set for the learning of the current sub model may be sensor data accumulated for six months. The size of the generation time interval for classifying the training data sub sets may be constant or different. Even though the size of the time interval is set to be different, if the recipe of the process is changed, the training data accumulated before and after changing the recipe may be included in different training data sub sets.

In an example of FIG. 3, the training data sub set 1 351 may be the oldest generated training data. The training data sub set n 321 may be the latest generated training data. In one exemplary embodiment, the training data sub set may be grouped correspondingly to the change of the recipe of the process.

The computing device 100 may train the anomaly detection sub model 1 350 using the training data sub set 1 351. The learning completed anomaly detection sub model 1 350 may be included in the anomaly detection model 300. The computing device 100 may train a next anomaly detection sub model using the next training data sub set. In this case, at least some of the trained previous anomaly detection sub models may be transferred to the next anomaly detection sub model. As described above, for example, the next anomaly detection sub model may share a part of a weight of the learned previous anomaly detection sub model. The anomaly detection model 300 of the exemplary embodiment of the present disclosure may continuously be trained through the above-described manner.

The computing device 100 may learn the anomaly detection sub model n-2 340 using the training data sub set n-2 341. In this case, the computing device 100 may transfer a part of an anomaly sub model n-3 (which is not illustrated and a previous anomaly detection sub model of an anomaly detection sub model n-2 340). The learning completed anomaly detection sub model n-2 340 may be included in the anomaly detection model 300. The computing device 100 may store the learning completed anomaly detection sub model n-2 340 separately from other anomaly detection sub model.

The computing device 100 may learn the anomaly detection sub model n-1 330 using the training data sub set n-1 331. The training data sub set n-1 331 may include training data generated during a time interval later than a time interval when the training data sub set n-2 341 is generated. The anomaly detection sub model n-1 330 may be a sub model which is generated later than the anomaly detection sub model n-2 340. The computing device 100 may use a part of the learned state of the anomaly detection sub model n-2 340 for the learning of the anomaly detection sub model n-1 330. The computing device 100 may set a part of an initial weight of the anomaly detection sub model n-1 330 as a weight of the learned anomaly detection sub model n-2 340. The learning completed anomaly detection sub model n-1330 may be included in the anomaly detection model 300. The computing device 100 may store the learning completed anomaly detection sub model n-1330 separately from other anomaly detection sub model.

The computing device 100 may train the anomaly detection sub model n 320 using the training data sub set n 321. The training data sub set n 321 may include training data generated during a time interval later than a time interval when the training data sub set n-1331 is generated. The anomaly detection sub model n 320 may be a sub model which is generated later than the anomaly detection sub model n-1330. The computing device 100 may use a part of the learned state of the anomaly detection sub model n-1 330 for the learning of the anomaly detection sub model n 320. The computing device 100 may set at least a part of an initial weight of the anomaly detection sub model n 320 as a weight of the learned anomaly detection sub model n-1 330. The training completed anomaly detection sub model n 320 may be included in the anomaly detection model 300. The computing device 100 may store the learning completed anomaly detection sub model n 320 separately from other anomaly detection sub model.

The computing device 100 train the anomaly detection sub models using the plurality of training data sub sets to generate the anomaly detection model 300 so that the anomaly detection model 300 processes different types of input data. When each anomaly detection sub model is trained, the computing device 100 utilizes the learning completed previous anomaly detection sub model so that the knowledge of the learning completed sub model is not forgotten by updating the sub model. When the process is changed, the acquired input data may be correspondingly changed. However, a lot of parts of the input data before and after the process change may be shared. Therefore, the anomaly detection sub models are generated in accordance with the change of the input data such as the process change so that the input data can be processed regardless of the input data change and the knowledge learned between anomaly detection sub models is transmitted to the next sub model. Therefore, a problem of the performance degradation due to the forgetting may be solved.

Figure 4:
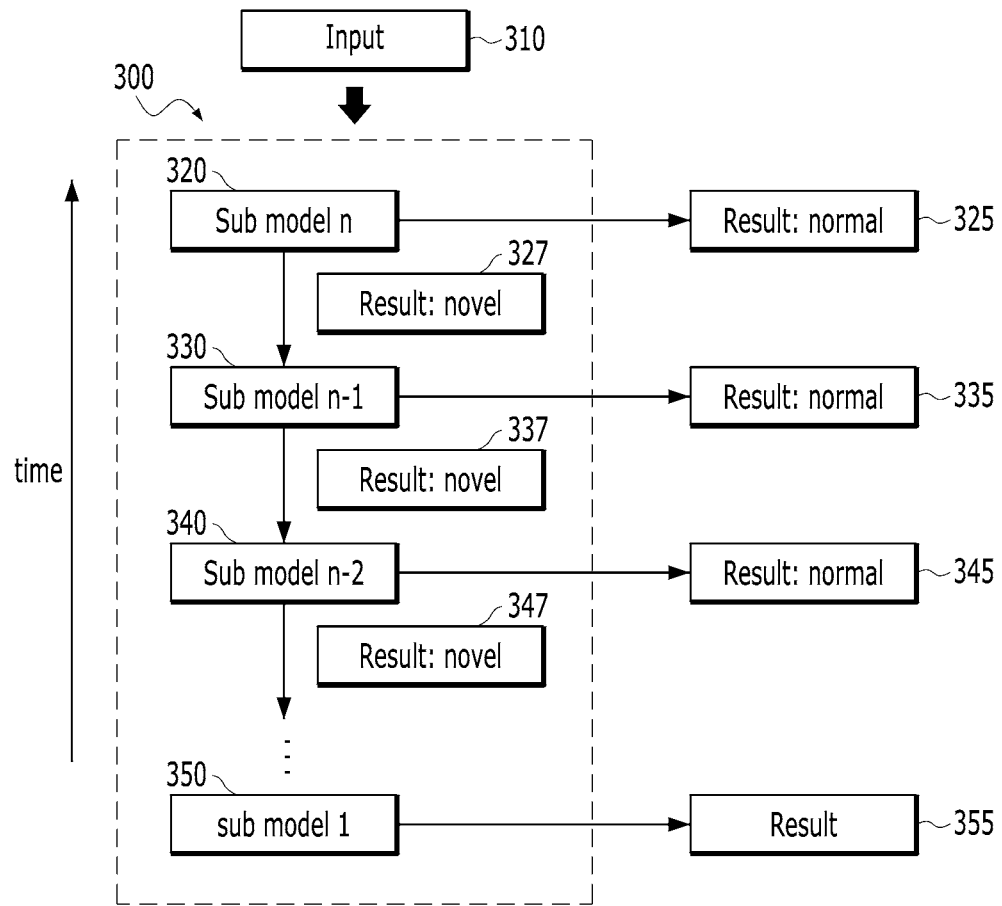
FIG. 4 is a schematic view illustrating an anomaly detecting process of data using an anomaly detection model according to an exemplary embodiment of the present disclosure.

FIG. 4 is a schematic view illustrating an anomaly detecting process of data using an anomaly detection model according to an exemplary embodiment of the present disclosure.

The computing device 100 may determine whether there is an anomaly in input data 310 using an anomaly detection model 300. The anomaly detection model 300 may include a plurality of anomaly detection sub models 320, 330, 340, and 350. As described above, the anomaly detection sub models 320, 330, 340, and 350 are trained correspondingly to the grouped training data and share the knowledge learned in the previous sub model.

The computing device 100 may process the input data 310 which may be generated in the process during continuation of the process. The computing device 100 may determine whether there is an anomaly in the input data 310 using at least some of the plurality of anomaly detection sub models 320, 330, 340, and 350 included in the anomaly detection model 300. The computing device 100 may determine whether there is an anomaly in the input data 310 first using an anomaly detection sub model n 320 which is the latest anomaly detection sub model. As a determination result using the anomaly detection sub model n 320, when the computing device 100 determines that there is no new pattern in the input data 310, the computing device 100 may determine (325) that the input data 310 is normal data. As a determination result using the anomaly detection sub model n 320, when the computing device 100 determines that there is a new pattern in the input data 310 (327), the new pattern may be an anomaly or a normal pattern of the previous process which is not learned by the anomaly detection sub model n 320. Further, such a new pattern may be a part that the knowledge learned in the previous anomaly detection sub model is insufficiently transferred. Therefore, in this case, when it is determined that a new pattern is included in input data as a result of determining whether the input data includes a new pattern using the anomaly detection sub model n 320, the computing device 100 may determine whether a new pattern is included in the input data using the anomaly detection sub model n-1 330.

When it is determined that the input data 310 does not include a new pattern (that is, a pattern which is not included in the training data sub set n-1 331) as a result of determining whether a new pattern is included in the input data 310 using the anomaly detection sub model n-1 330, the computing device 100 may determine the input data 310 as normal data 335. That is, the input data 310 is determined to include a new pattern in the anomaly detection sub model n 320, but is determined to include only a trained pattern in the anomaly detection sub model n-1 330. In this case, the input data 310 may be input data acquired in the producing process by the previous recipe. That is, in this case, the input data 310 may be an image regarding a normal product of the past process, data for a normal operation parameter of the previous process, or sensor data of the past process. Further, since it is determined that the input data incudes new data in the recent anomaly detection sub model, the past process may be different from the latest process.

When it is determined (337) that a new pattern is included in the input data 310 as a result of determining whether a new pattern is included in the input data 310 using an anomaly detection sub model n-1 330, the computing device 100 may determine whether the new pattern is included in the input data 310 using the anomaly detection sub model n-2 340.

When the computing device 100 determines that the input data 310 does not include a new pattern (that is, a pattern which is not included in the training data sub set n-2 341) as a result of determining whether a new pattern is included in the input data 310 using the anomaly detection sub model n-2 340, the computing device 100 may determine the input data 310 as normal data (345). That is, the input data 310 is determined to include a new pattern in the anomaly detection sub model n 320 and the anomaly detection sub model n-1 330, but is determined to include only a trained pattern in the anomaly detection sub model n-2 340. In this case, the input data 310 may be input data acquired in the producing process by the past recipe. That is, in this case, the input data 310 may be sensor data acquired in the past process. Further, in the latest anomaly detection sub model, it is determined to include a new pattern so that the past process is different from the latest process.

When the computing device 100 determines (347) that a new pattern is included in the input data 310 as a result of determining whether a new pattern is included in the input data 310 using an anomaly detection sub model n-2 340, the computing device 100 may determine whether the new pattern is included in the input data 310 using a previous anomaly detection sub model (not illustrated) of the anomaly detection sub model n-2 340. When it is determined that the new pattern is included in the input data as described above, the computing device 100 may determine whether a new pattern is included in the input data using the previous anomaly detection sub model and when it is determined that the input data is normal, the computing device 100 may determine that the input data is normal by stopping the call of the previous anomaly detection sub model. Further, when the computing device 100 determines that the input data is included as a new pattern in the determination using all the anomaly detection sub models, it is determined that the input data 310 includes an anomaly.

According to an exemplary embodiment of the present disclosure, the computing device 100 may take the effect of the continual learning only by accessing the previous sub model without maintaining all the past training data, by accumulating sub models and using an anomaly determining method as described above. That is, when the model is updated, the existing model is maintained at the time of updating the model without retraining through all the previous training data and a new model which inherits a part of the existing model is trained with new training data to update the model in accordance with the input data change. Further, both models before and after updating the model are possessed at the time of updating a model, so that the input data may be processed through all the models without maintain all the training data so that a performance degradation problem in accordance with the input data change may be solved. The performance of the computing device itself for anomaly detection can be improved by the continuous learning method and model accumulation of an embodiment of the present disclosure.

Figure 5:
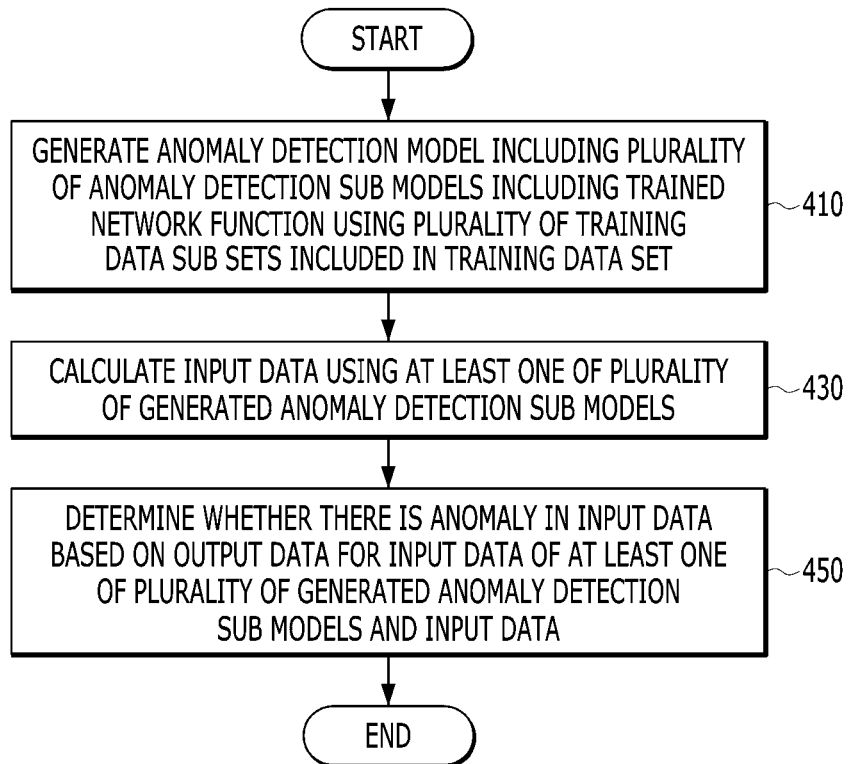
FIG. 5 is a flowchart of an anomaly detecting method of data according to an exemplary embodiment of the present disclosure.

FIG. 5 is a flowchart of an anomaly detecting method of data according to an exemplary embodiment of the present disclosure.

The computing device 100 may generate an anomaly detection model including a plurality of anomaly detection sub models including a trained network function using a plurality of training data sub sets included in the training data set in step 410. The plurality of training data sub sets may include different training data which are grouped by a predetermined criterion. According to an exemplary embodiment of the present disclosure, the predetermined criteria for grouping the plurality of training data sub sets may include at least one of a training data generation time interval and a domain of training data.

When the recipe is changed after generating the first anomaly detection sub model including the first network function learned by the first training data sub set, the computing device 100 may generate the second anomaly detection sub model including the second network function learned by the second training data sub set. The first training data sub set and the second training data sub set may include sensor data of the producing process which operates by different recipes and an operation parameter of the producing equipment. Here, an initial weight of the second network function may at least partially share a weight of the first network function which is previously learned. Here, the first time interval may be earlier than the second time interval. Therefore, the first anomaly detection sub model may be a model which is generated earlier than the second anomaly detection sub model. After generating the first anomaly detection sub model, in order to generate the second anomaly detection sub model based on the recipe change, the computing device 100 reuses a part of knowledge obtained from the first anomaly detection sub model by utilizing a part of the first anomaly detection sub model for a part of the second anomaly detection sub model to update the model. According to an exemplary embodiment of the present disclosure, when a next sub model is generated, a part of previous model is reused so that the knowledge learned from the previous model is not forgotten and led to a next model so that a performance of the next model may be increased and an overall learning time may be reduced. The computing device 100 stores the anomaly detection sub models after generating each anomaly detection sub model using each training data sub set to generate an anomaly detection model.

The plurality of anomaly detection sub models may include a first anomaly detection sub model including a first network function learned by a first training data sub set configured by training data generated during a first time interval and a second anomaly detection sub model including a second network function previously learned by a second training data sub set configured by training data generated during a second time interval which is different from the first time interval. For example, the training data sub set of the present disclosure may be grouped in accordance with the generation time interval of the training data. When the recipe is changed at every six months during the semiconductor process, the training data generated for six months may configure one training data sub set. Description of the above-described semiconductor process is only an example and the present disclosure is not limited thereto.

According to another exemplary embodiment of the present disclosure, the plurality of anomaly detection sub models may be trained with a plurality of training data sub sets. For example, the anomaly detection sub model may be trained with a first training data sub set configured by training data generated during a first time interval and a second training data sub set configured by training data generated during a second time interval. That is, one anomaly detection sub model may be trained for a plurality of normal patterns. For example, the computing device 100 may train one anomaly detection sub model with a plurality of training data sub sets. According to another exemplary embodiment of the present disclosure, the training data generated during the first time interval may include training data generated by a plurality of recipes. In this case, the computing device 100 trains one anomaly detection sub model with the plurality of normal patterns. In this case, the computing device 100 may detect whether the input data generated by a plurality of recipes includes an anomaly by one anomaly detection sub model. That is, according to another exemplary embodiment of the present disclosure, there may be a plurality of normal patterns (as described above, one anomaly detection sub model may learn a plurality of normal patterns) corresponding to one anomaly detection sub model and the computing device 100 may process the plurality of normal patterns using one anomaly detection sub model. When the anomaly detection sub model is trained with the plurality of normal patterns, even though the number of training data is insufficient, the learning may be allowed and the knowledge learned for one normal pattern may be used to learn another normal pattern.

The computing device 100 may calculate the input data using at least one of the plurality of generated anomaly detection sub models in step 430. The computing device 100 may calculate the input data using the latest anomaly detection sub model among the plurality of generated anomaly detection sub models. The computing device 100 may calculate the input data using the latest anomaly detection sub model among the plurality of anomaly detection sub models and may also calculate the input data using an anomaly detection sub model which is gradually generated in the past from the latest anomaly detection sub model. The input data may include image data of a product acquired during the producing process, an operation parameter of the producing equipment, and sensor data acquired during the producing process, but the present disclosure is not limited thereto. The computing device 100 may perform an operation of modifying the input data to be data different from the input data using an anomaly detection sub model and then restoring the input data. The computing device 100 may calculate to reduce a dimensionality of the input data using the anomaly detection sub model and restore the dimensionality to generate an output which is similar to the input data. The computing device 100 extracts a feature from the input data using the anomaly detection sub model and restores the input data based on the feature. As described above, a network function included in the anomaly detection sub model of the present disclosure may include a network function which is capable of restoring the input data so that the computing device 100 calculates the input data using the anomaly detection sub model to restore the input data. According to another exemplary embodiment of the present disclosure, the anomaly detection sub model may include a plurality of network functions and in this case, the computing device 100 may input the input data to the plurality of network functions to perform the calculation.

The computing device 100 may determine whether there is an anomaly in the input data, based on an output data and input data for at least one input data among the plurality of generated anomaly detection sub models in step 450. The computing device 100 may determine whether there is an anomaly in the input data based on a reconstruction error calculated based on the comparison of the output data and the input data. When all the plurality of anomaly detection sub models included in the anomaly detection model determines that there is an anomaly in the input data, the computing device 100 may determine that there is an anomaly in the input data.

Figure 6:
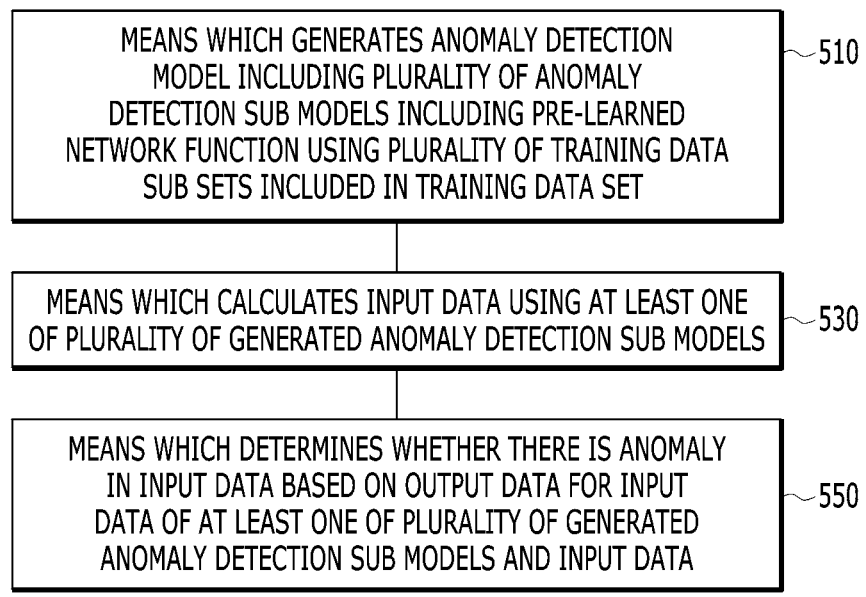
FIG. 6 is a block diagram illustrating a unit for implementing an anomaly detecting method of data according to an exemplary embodiment of the present disclosure.

FIG. 6 is a block diagram illustrating a unit for implementing an anomaly detecting method of data according to an exemplary embodiment of the present disclosure.

The anomaly detecting method of data according to an exemplary embodiment of the present disclosure may be implemented by the following units.

An anomaly detecting method of data according to an exemplary embodiment of the present disclosure may be embodied by a unit 510 which generates an anomaly detection model including a plurality of anomaly detection sub models including a trained network function using a plurality of training data sub sets included in the training data set; a unit 530 which calculates input data using at least one of the plurality of generated anomaly detection sub models; and a unit 550 which determines whether there is an anomaly in the input data based on output data for at least one input data among the plurality of generated anomaly detection sub models and the input data.

As an alternative embodiment of the anomaly detecting method of data, the unit 530 which calculates input data using at least one of the plurality of generated anomaly detection sub models may include a unit which reduces a dimensionality of the input data by a network included in the anomaly detection sub model to generate dimensionality reduced data and then generate output data in which the dimensionality of the dimensionality reduced data is restored.

As an alternative embodiment of the anomaly detecting method of data, the unit 550 which determines whether there is an anomaly in the input data may include a unit which determines whether there is an anomaly in the input data based on a reconstruction error calculated based on the comparison of the output data and the input data.

As an alternative embodiment of the anomaly detecting method of data, the method may be embodied by a unit which when all the plurality of anomaly detection sub models included in the anomaly detection model which is additionally added determine that there is an anomaly in the input data, determines that there is an anomaly in the input data.

As an alternative embodiment of the anomaly detecting method of data, the unit 550 which determines whether there is anomaly in the input data may include a unit which determines whether there is anomaly in the input data using the second anomaly detection sub model and a unit which determines whether there is an anomaly in input data using the first anomaly detection sub model when the second anomaly detection sub model determines that there is an anomaly in the input data.

Figure 7:
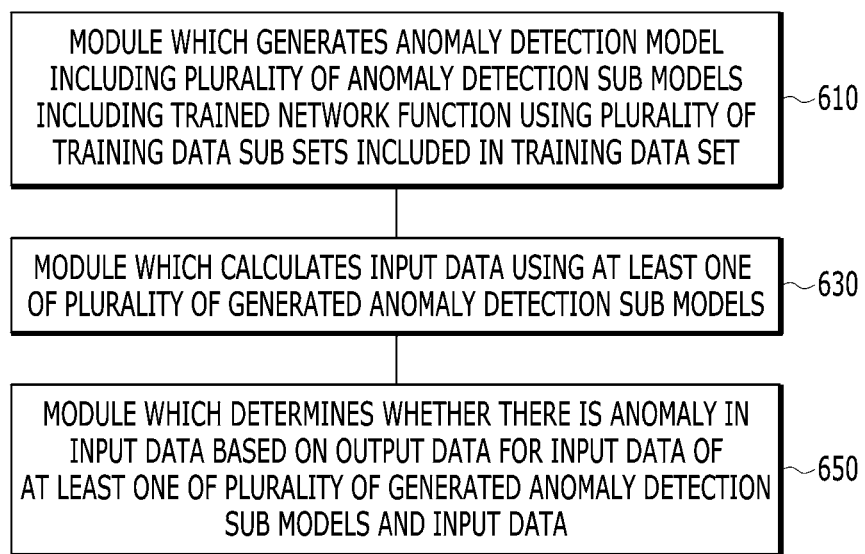
FIG. 7 is a block diagram illustrating a module for implementing an anomaly detecting method of data according to an exemplary embodiment of the present disclosure.

FIG. 7 is a block diagram illustrating a module for implementing an anomaly detecting method of data according to an exemplary embodiment of the present disclosure.

The anomaly detecting method of data according to an exemplary embodiment of the present disclosure may be implemented by the following modules.

An anomaly detecting method of data according to an exemplary embodiment of the present disclosure may be embodied by a module 610 which generates an anomaly detection model including a plurality of anomaly detection sub models including a trained network function using a plurality of training data sub sets included in the training data set; a module 630 which calculates input data using at least one of the plurality of generated anomaly detection sub models; and a module 650 which determines whether there is an anomaly in the input data based on output data for input data of at least one of the plurality of generated anomaly detection sub models and the input data.

As an alternative embodiment of the anomaly detecting method of data, the module 630 which calculates input data using at least one of the plurality of generated anomaly detection sub models may include a module which reduces a dimensionality of the input data by a network included in the anomaly detection sub model to generate dimensionality reduced data and then generate output data in which the dimensionality of the dimensionality reduced data is restored.

As an alternative embodiment of the anomaly detecting method of data, the module 650 which determines whether there is an anomaly in the input data may include a module which determines whether there is an anomaly in the input data based on a reconstruction error calculated based on the comparison of the output data and the input data.

As an alternative embodiment of the anomaly detecting method of data, the method may be embodied by a module which when all the plurality of anomaly detection sub models included in the anomaly detection model which is additionally added determines that there is an anomaly in the input data, determines that there is an anomaly in the input data.

As an alternative embodiment of the anomaly detecting method of data, the module 650 which determines whether there is an anomaly in the input data may include a module which determines whether there is an anomaly in the input data using the second anomaly detection sub model and a module which determines whether there is an anomaly in input data using the first anomaly detection sub model when the second anomaly detection sub model determines that there is an anomaly in the input data.

Figure 8:
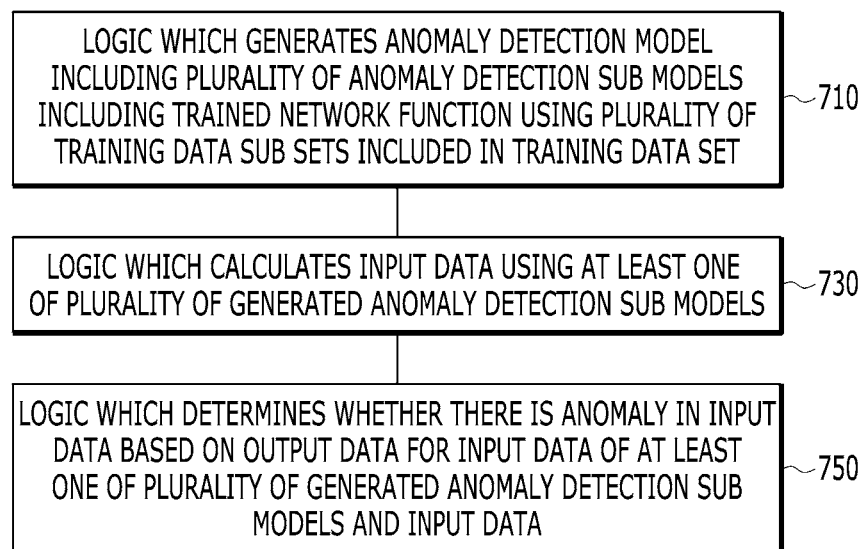
FIG. 8 is a block diagram illustrating a logic for implementing an anomaly detecting method of data according to an exemplary embodiment of the present disclosure.

FIG. 8 is a block diagram illustrating a logic for implementing an anomaly detecting method of data according to an exemplary embodiment of the present disclosure.

The anomaly detecting method of data according to an exemplary embodiment of the present disclosure may be implemented by the following logics.

An anomaly detecting method of data according to an exemplary embodiment of the present disclosure may be embodied by a logic 710 which generates an anomaly detection model including a plurality of anomaly detection sub models including a trained network function using a plurality of training data sub sets included in the training data set; a logic 730 which calculates input data using at least one of the plurality of generated anomaly detection sub models and a logic 750 which determines whether there is an anomaly in the input data based on output data for input data of at least one of the plurality of generated anomaly detection sub models and the input data.

As an alternative embodiment of the data anomaly detecting method, the logic 730 which calculates input data using at least one of the plurality of generated anomaly detection sub models may include a logic which reduces a dimensionality of the input data by a network included in the anomaly detection sub model to generate dimensionality-reduced data and then generate output data in which the dimensionality of the dimensionality reduced data is restored.

As an alternative embodiment of the anomaly detecting method of data, the logic 750 which determines whether there is an anomaly in the input data may include a logic which determines whether there is an anomaly in the input data based on a reconstruction error calculated based on the comparison of the output data and the input data.

As an alternative embodiment of the anomaly detecting method of data, the method may be embodied by a logic which when all the plurality of anomaly detection sub models included in the anomaly detection model which is additionally added determines that there is an anomaly in the input data, determines that there is an anomaly in the input data.

As an alternative embodiment of the anomaly detecting method of data, the logic 750 which determines whether there is an anomaly in the input data may include a logic which determines whether there is an anomaly in the input data using the second anomaly detection sub model and a logic which determines whether there is an anomaly in input data using the first anomaly detection sub model when the second anomaly detection sub model determines that there is an anomaly in the input data.

Figure 9:
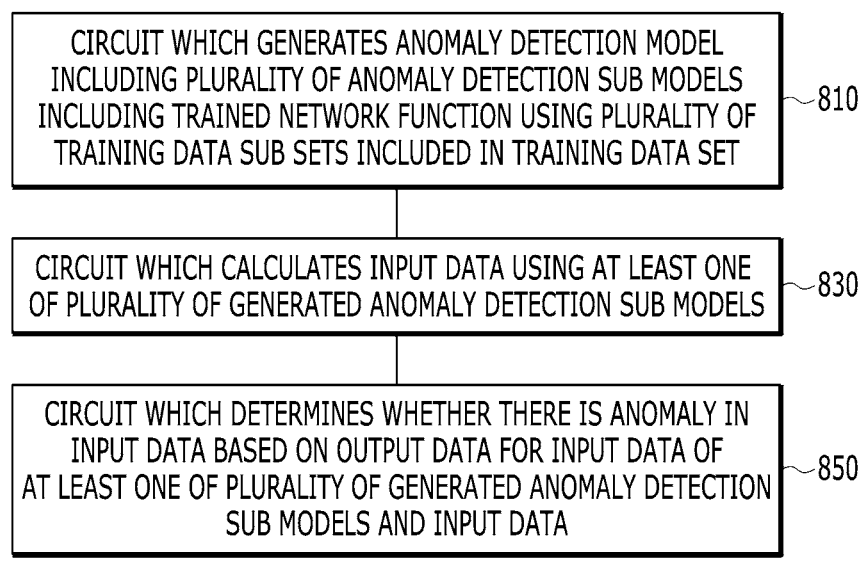
FIG. 9 is a block diagram illustrating a circuit for implementing an anomaly detecting method of data according to an exemplary embodiment of the present disclosure.

FIG. 9 is a block diagram illustrating a circuit for implementing an anomaly detecting method of data according to an exemplary embodiment of the present disclosure.

The anomaly detecting method of data according to an exemplary embodiment of the present disclosure may be implemented by the following circuits.

An anomaly detecting method of data according to an exemplary embodiment of the present disclosure may be embodied by a circuit 810 which generates an anomaly detection model including a plurality of anomaly detection sub models including a trained network function using a plurality of training data sub sets included in the training data set; a circuit 830 which calculates input data using at least one of the plurality of generated anomaly detection sub models; and a circuit 850 which determines whether there is an anomaly in the input data based on output data for input data of at least one of the plurality of generated anomaly detection sub models and the input data.

As an alternative embodiment of the data anomaly detecting method, the circuit 830 which calculates input data using at least one of the plurality of generated anomaly detection sub models may include a circuit which reduces a dimensionality of the input data by a network included in the anomaly detection sub model to generate dimensionality-reduced data and then then generate output data in which the dimensionality of the dimensionality reduced data is restored.

As an alternative embodiment of the anomaly detecting method of data, the circuit 850 which determines whether there is an anomaly in the input data may include a circuit which determines whether there is an anomaly in the input data based on a reconstruction error calculated based on the comparison of the output data and the input data.

As an alternative embodiment of the anomaly detecting method of data, the method may be embodied by a circuit which when all the plurality of anomaly detection sub models which is additionally included in the anomaly detection model determines that there is an anomaly in the input data, determines that there is an anomaly in the input data.

As an alternative embodiment of the anomaly detecting method of data, the circuit 850 which determines whether there is an anomaly in the input data may include a circuit which determines whether there is an anomaly in the input data using the second anomaly detection sub model and a circuit which determines whether there is an anomaly in input data using the first anomaly detection sub model when the second anomaly detection sub model determines that there is an anomaly in the input data.

Those skilled in the art will further appreciate that the various illustrative logical blocks, configurations, modules, circuits, means, logics, and algorithm steps described in connection with the embodiments disclosed herein may be implemented as electronic hardware, computer software, or combinations thoseof. To clearly illustrate the interchangeability of hardware and software, various illustrative components, blocks, configurations, means, logics, modules, circuits, and steps have been described above generally in terms of their functionality. Whether the functionality is implemented as hardware or software depends on a specific application and design constraints imposed on the overall system. Even though those skilled in the art may implement functionality described by various methods for specific applications, the determinations of the implementation may not be interpreted departing from the present disclosure.

Figure 10:
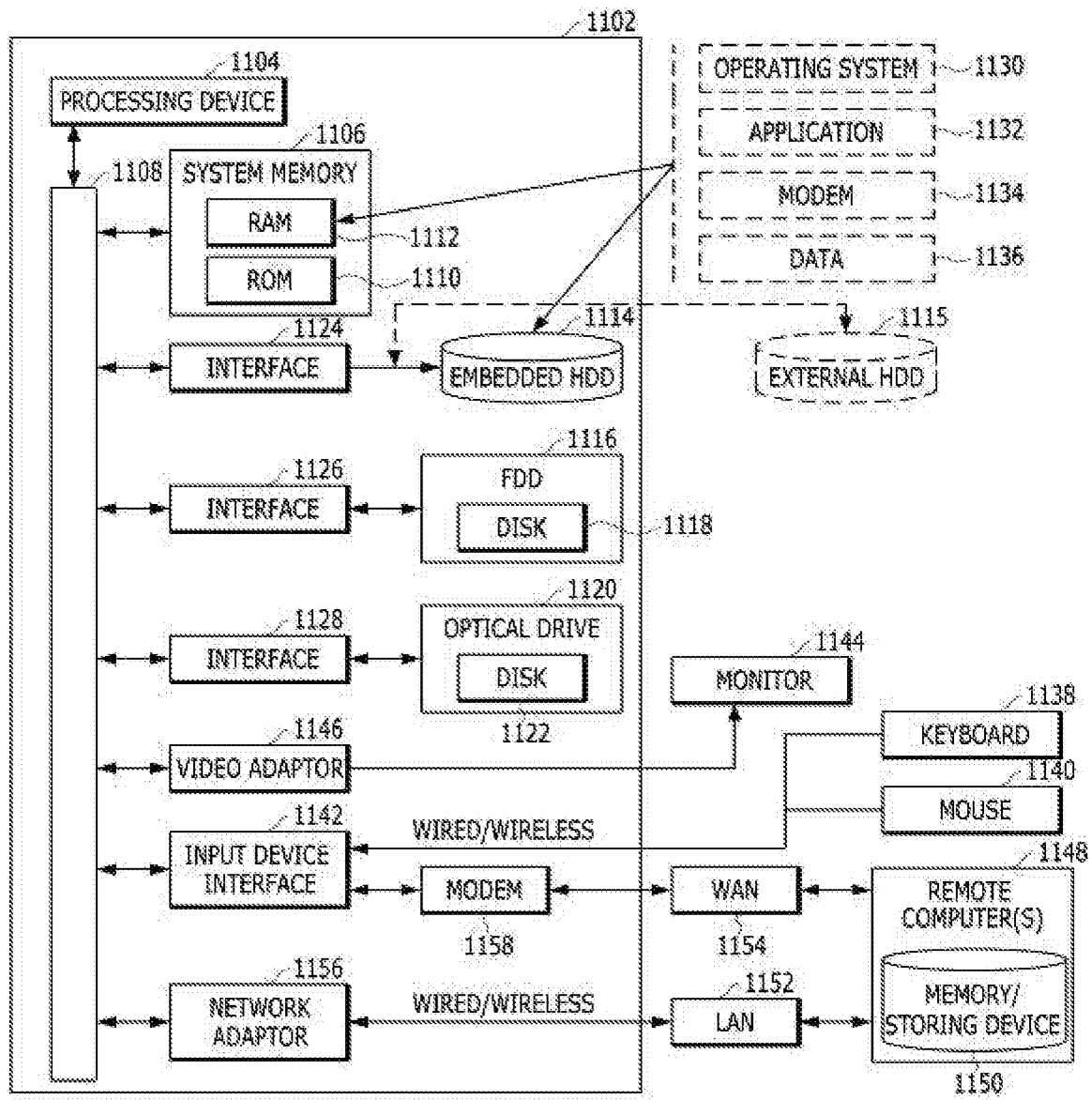
FIG. 10 illustrates a simple and general schematic view of an exemplary computing environment in which exemplary embodiments of the present disclosure are embodied.

FIG. 10 illustrates a simple and general schematic view of an exemplary computing environment in which exemplary embodiments of the present disclosure are embodied.

Even though the present disclosure is generally described in regard to a computer executable instruction which can be executable on one or more computers, it is obvious to those skilled in the art that the present disclosure may be implemented by being coupled with other program modules and/or a combination of hardware and software.

Generally, the program module includes a routine, a program, a component, a data structure, or the like which performs a specific task or implements a specific abstract data type. Further, those skilled in the art may well understand that the method of the present disclosure may be embodied not only by a single processor or a multi-processor computer system, a mini computer, and a main frame computer, but also a personal computer, a hand-held computing apparatus, microprocessor based or programmable home appliances (which may be connected to one or more related devices to be operated), and other computer system configurations.

The described exemplary embodiments of the present disclosure may also be embodied in a distributed computing environment in which some tasks are performed by remote processing devices which are connected to each other through a communication network. In the distributed computing environment, a program module may be located in both local and remote memory storing devices.

Generally, a computer includes various computer readable media. If a medium is accessible by the computer, the medium may be the computer readable medium and the computer readable medium includes volatile and non-volatile media, transitory and non-transitory media, and mobile and non-mobile media. As an example which is not limitation, the computer readable medium may include a computer readable storage medium and a computer readable transmission medium. The computer readable storage medium includes a volatile or non-volatile medium, a transitory or non-transitory medium, and a mobile or a non-mobile medium which are implemented by an arbitrary method or technique which stores information such as a computer readable instruction, a data structure, a program module or other data. The computer storage medium includes a RAM, a ROM, an EEPROM, a flash memory, or other memory techniques, a CD-ROM, a digital video disk (DVD), or other optical disk storing devices, a magnetic cassette, a magnetic tape, a magnetic disk storing device, or other magnetic storing devices, or other arbitrary media which are accessed by a computer and are used to store desired information, but is not limited thereto.

The computer readable transmission medium generally implements a computer readable instruction, a data structure, a program module, or other data in a modulated data signal such as a carrier waver or other transport mechanism and includes all information transfer medium. A term "modulated data signal" refers to a signal in which one or more properties of the signal is set or changed to encode information in the signal. As an example which is not limitation, the computer readable transmission medium includes a wired medium such as a wired network or direct wired connection and a wireless medium such as sound, RF, infrared ray, or other wireless medium. It is considered that a combination of any of the above-mentioned media may also be included in the scope of the computer readable transmission medium.

An exemplary environment 1100 including a computer 1102 which implements various aspects of the present disclosure is illustrated and the computer 1102 includes a processing device 1104, a system memory 1106, and a system bus 1108. The system bus 1108 connects system components including a system memory 1106 (not to be limited thereto) to the processing device 1104. The processing device 1104 may be an arbitrary processor among various commercial processors. A dual processor and other multiprocessor architectures may also be used as the processing device 1104.

The system bus 1108 may be any of several types of bus structures which is additionally connected to a local bus which uses any of a memory bus, a peripheral device bus, and various commercial bus architectures. The system memory 1106 includes a read only memory (ROM) 2110 and a random access memory (RAM) 2112. A basic input/output system (BIOS) is stored in a non-volatile memory 2110 such as a ROM, an EPROM, and an EEPROM and the BIOS includes a basic routine which assists to transmit information between components in the computer 1102 while the computer is activated. The RAM 2112 may further include a fast RAM such as a static RAM for caching data.

The computer 1102 further includes an embedded hard disk drive (HDD) 2114 (for example, EIDE, SATA) which may also be configured as an external drive in an appropriate chassis (not illustrated), a magnetic floppy disk drive (FDD) 2114 (for example, to read data from a portable diskette 2118 or record data therein), and an optical disk driver 1120 (for example, to read a CD-ROM disk 1122 or read data from other high quantity optical medium such as a DVD or record data therein). The hard disk drive 2114, the magnetic disk drive 2116, the optical disk drive 1120 may be connected to the system bus 1108 through a hard disk drive interface 1124, a magnetic disk drive interface 1126, and an optical drive interface 1128. The interface 1124 for implementing an external drive includes at least one or both of universal serial bus (USB) and IEEE 1394 interface technique.

These drives and a computer readable medium related therewith provide non-volatile storage of data, a data structure, a computer executable instruction, or the like. In the case of the computer 1102, the drive and the medium correspond to storing arbitrary data as an appropriate digital type. In the description of the computer readable medium, an HDD, a portable magnetic disk, and a portable optical medium such as a CD or a DVD have been mentioned. However, it is well known to those skilled in the art that other types of computer readable media such as a zip drive, a magnetic cassette, a flash memory card, or a cartridge may also be used in an exemplary operating environment and the arbitrary medium may include a computer executable instruction which performs the methods of the present disclosure.

A large number of program modules including an operating system 2130, one or more application programs 2132, other program module 2134, and program data 2136 may be stored in the drive and the RAM 2112. The operating system, the application, the module and/or all or a part of data are also cached by the RAM 2112. It is obvious that the present disclosure may be implemented by various commercially applicable operating systems or a combination of operating systems.

A user may input a command and information to the computer 1102 through one or more wired/wireless input device, for example, a pointing device such as a keyboard 2138 and a mouse 1140. Other input device (not illustrated) may include a microphone, an IR remote controller, a joystick, a game pad, a stylus pen, a touch screen, or the like. These and other input devices are sometimes connected to the processing device 1104 through an input device interface 1142 which is connected to the system bus 1108, but may be connected by a parallel port, an IEEE 1394 serial port, a game port, a USB port, an IR interface, or other interfaces.

A monitor 1144 or other type of display device is also connected to the system bus 1108 through an interface such as a video adaptor 1146. In addition to the monitor 1144, a computer generally includes other peripheral output devices (not illustrated) such as a speaker or a printer.

The computer 1102 may operate in a networked environment using logical connection of remote computer(s) 1148 to one or more computers through wired and/or wireless communication. The remote computer(s) 1148 may be a workstation, a computing device computer, a router, a personal computer, a portable computer, a microprocessor based amusement machine, a peer device, or other general network node and generally, includes a large number of or all the components which have been described for the computer 1102. However, for the purpose of simplicity, only a memory storing device 1150 is illustrated. The illustrated logical connection includes wired/wireless connection to a local area network (LAN) 1152 and/or larger network, for example, a wide area network (WAN) 1154. The LAN and WAN networking environments are general in an office and a company and facilitate enterprise-wide computer network such as Intranet and these are all connected to a worldwide computer network, for example, Internet.

When the computer 1102 is used in the LAN networking environment, the computer 1102 is connected to a local network 1152 through a wired and/or wireless communication network interface or an adaptor 1156. The adaptor 1156 allows wired or wireless communication to the LAN 1152 and the LAN 1152 also includes a wireless access point provided therein to communicate with the wireless adaptor 1156. When the computer 1102 is used in the WAN networking environment, the computer 1102 has other means, for example, includes a modem 1158 or is connected to a communication computing device on the WAN 1154, or uses Internet to set communication through the WAN 1154. The modem 1158 which may be an embedded or external, and wired or wireless device is connected to the system bus 1108 through the serial port interface 1142. In a networked environment, program modules described for the computer 1102 or a part thereof may be stored in the remote memory/storing device 1150. It is understood that the illustrated network connection is an example and other means to set a communication link between computers may be used.

The computer 1102 performs operations to communicate with an arbitrary wireless device or entity which is disposed through wireless communication to operate, for example, a printer, a scanner, a desktop and/or portable computer, a portable data assistant (PDA), a communication satellite, arbitrary equipment or location related with a wireless detectable tag, and a telephone. This includes at least Wi-FI and Bluetooth wireless technology. Therefore, communication may be a previously defined structure such as a network of the related art or simply ad hoc communication between at least two devices.

Wi-Fi (wireless fidelity) may allow connection to the Internet without using a wire. The Wi-Fi is a wireless technique such as a cell phone which allows such a device, for example, a computer to transmit and receive data indoor and outdoor, that is, in any place within a coverage of a base station. The Wi-Fi network uses a wireless technology called IEEE 802.11 (a,b,g, or the like) to provide safe, reliable, and fast wireless connection. Wi-Fi may be used to connect computers to each other or to the Internet, and a wired network (IEEE 802.3 or Ethernet is used). The Wi-Fi network operates, for example, at a 11 Mbps (802.11a) or 54 Mbps (802.11b) data rate in an unauthorized wireless band of 2.4 and 5 GHz or operates in a product including both bands (dual band).

Those skilled in the art may understand that information and signals may be represented using various arbitrary technologies and techniques. For example, data, indications, commands, information, signals, bits, symbols, and chips which may be referred in the above description may be represented by voltages, currents, electromagnetic waves, magnetic fields or particles, optical fields or particles, or an arbitrary combination thereof.

Those skilled in the art may understand that various exemplary logical blocks, modules, processors, units, circuits, and algorithm steps which have been described with respect to the exemplary embodiments disclosed herein may be implemented by electronic hardware, various types of programs (for the convenience, referred to as "software" here), a design code, or a combination thoseof. In order to clearly describe compatibility of hardware and software, various exemplary components, blocks, modules, circuits, and steps are generally described above with respect to functions thoseof. Whether these functions are implemented as hardware or software is determined depending on design restrictions which are applied to a specific application and the entire system. Those skilled in the art may implement the function, which is described by various methods, of the specific application but the implementation determination is not interpreted to depart from the scope of the present disclosure.

Various exemplary embodiments suggested herein may be implemented by a method, a device, or a standard programming and/or an article using an engineering technique. A term "article" includes a computer program which is accessible from an arbitrary computer readable device, a carrier or a media. For example, the computer readable medium includes a magnetic storing device (for example, a hard disk, a floppy disk, or a magnetic strip), an optical disk (for example, a CD or a DVD), a smart card, and a flash memory device (for example, an EEPROM, a card, a stick, or a key drive), but is not limited thereto. Further, various storage media suggested herein include one or more devices for storing information and/or other machine readable medium.

It should be understood that a specific order or a hierarchical structure of steps in suggested processes are examples of exemplary approaches. It should be understood that a specific order or a hierarchical structure of steps in the processes may be rearranged within the scope of the present disclosure, based on a design priority. The accompanying method claims provide elements of various steps in the order of sample, but the claims are not meant to be limited to the suggested specific order or hierarchical structure.

Description of the suggested exemplary embodiment is provided to allow those skilled in the art to use or embody the present disclosure. Various modifications of the exemplary embodiments may be apparent to those skilled in the art and general principles defined herein may be applied to other exemplary embodiments without departing from the scope of the present disclosure. Therefore, the present disclosure is not limited to the exemplary embodiments suggested herein, but interpreted in the broadest range which is consistent with principles suggested herein and new features.

What is claimed is:

1. A computer program stored in a non-transitory computer readable storage medium wherein when the computer program is executed in one or more processors, the computer program performs the following method for anomaly detection of data using a network function, the method comprising:

generating an anomaly detection model for performing anomaly detection independently of a normal pattern of input data including a plurality of anomaly detection sub models including a trained network function using a plurality of training data sub sets included in the training data set including data generated based on two or more of the normal patterns of input data, wherein when training an anomaly detection sub model based on a normal pattern of input data, an initial weight of at least one link, which connects between nodes, included in at least one of the plurality of anomaly detection sub models is based on a weight of at least one corresponding link, which connects between nodes, included in other trained anomaly detection sub models, which are trained by input data having different normal pattern(s);

calculating input data using at least one of the plurality of generated anomaly detection sub models; and determining whether there is an anomaly in the input data based on output data for input data of at least one of the plurality of generated anomaly detection sub models and the input data.

2. The computer program stored in a computer readable storage medium according to claim 1, wherein each of the plurality of training data sub sets includes different training data which are grouped by a predetermined criterion, and the predetermined criterion includes at least one of a generation time interval of the training data and a domain of the training data.

3. The computer program stored in a computer readable storage medium according to claim 1, wherein the plurality of anomaly detection sub models includes a first anomaly detection sub model including a first network function trained with the first training data sub set configured by training data generated during a first time interval and a second anomaly detection sub model including a second network function trained with the second training data sub set configured by training data generated during a second time interval which is different from the first time interval.

4. The computer program stored in a computer readable storage medium according to claim 3, wherein the first time interval is earlier than the second time interval and the first anomaly detection sub model is generated earlier than the second anomaly detection sub model.

5. The computer program stored in a computer readable storage medium according to claim 1, wherein the network function is a network function including a dimensionality reduction network and a dimensionality restoration network.

6. The computer program stored in a computer readable storage medium according to claim 1, wherein the trained network function is trained only with the normal pattern of input data which does not include an anomaly as training data and is trained to reduce and restore the dimensionality of the training data.

7. The computer program stored in a computer readable storage medium according to claim 1, wherein the calculating of input data using at least one of the plurality of generated anomaly detection sub models includes:

generating output data obtained by generating dimensionality reduction data by reducing a dimensionality of the input data by a network included in the anomaly detection sub model and then restoring the dimensionality of the dimensionality reduction data.

8. The computer program stored in a computer readable storage medium according to claim 1, wherein the determining of whether there is an anomaly in the input data includes:

determining whether there is an anomaly in the input data, based on a reconstruction error calculated based on the comparison of the output data and the input data.

9. The computer program stored in a computer readable storage medium according to claim 1, further comprising:

determining that there is an anomaly in the input data when all the plurality of anomaly detection sub models included in the anomaly detection model determines that there is an anomaly in the input data.

10. The computer program stored in a computer readable storage medium according to claim 3, wherein the determining of whether there is an anomaly in the input data includes:

determining whether there is an anomaly in input data using the second anomaly detection sub model; and determining whether there is an anomaly in input data using the first anomaly detection sub model when the second anomaly detection sub model determines that there is an anomaly in the input data.

11. The computer program stored in a computer readable storage medium according to claim 1, wherein a predetermined number of layers among layers of a dimensionality reduction network of the second network function sets a weight of the link, which connects between nodes, included in a corresponding layer of the first network function which is previously learned as an initial weight.

12. The computer program stored in a computer readable storage medium according to claim 1, wherein a predetermined number of layers among layers of a dimensionality restoration network of the second network function is initialized with a weight of the link, which connects between nodes, included in a corresponding layer of the first network function which is previously learned at every learning epoch.

13. The computer program stored in a computer readable storage medium according to claim 4, wherein a first training data sub set configured by training data generated for the first time interval to generate the first anomaly detection sub model is sampled at a lower sampling ratio than a sampling ratio of the second training data sub set for generating the second anomaly detection sub model so that only a part of the training data included in the first training data sub set is used to be trained.

14. An anomaly detecting method of data using a network function performed in one or more processors, the method comprising:

generating an anomaly detection model for performing anomaly detection independently of a normal pattern of input data including a plurality of anomaly detection sub models including a trained network function using a plurality of training data sub sets included in the training data set including data generated based on two or more of the normal patterns of input data, wherein when training an anomaly detection sub model based on a normal pattern of input data, an initial weight at least one link, which connects between nodes, included in at of at least one of the plurality of anomaly detection sub models is based on a weight of at least one corresponding link, which connects between nodes, included in other trained anomaly detection sub models, which are trained by input data having different normal pattern(s);

calculating input data using at least one of the plurality of generated anomaly detection sub models; and determining whether there is an anomaly in the input data based on output data for input data of at least one among the plurality of generated anomaly detection sub models and the input data.

15. A computing device, comprising:

one or more processors; and a memory which stores commands executable in the processor, wherein the processor is configured to generate an anomaly detection model for performing anomaly detection independently of a normal pattern of input data including a plurality of anomaly detection sub models including a trained network function using a plurality of training data sub sets included in the training data set including data generated based on two or more of the normal patterns of input data, wherein when training an anomaly detection sub model based on a normal pattern of input data, an initial weight of at least one link, which connects between nodes, included in at least one of the plurality of anomaly detection sub models is based on a weight of at least one corresponding link, which connects between nodes, included in other trained anomaly detection sub models, which are trained by input data having different normal pattern(s);

calculate input data using at least one of the plurality of generated anomaly detection sub models; and determine whether there is an anomaly in the input data based on output data for input data of at least one of the plurality of generated anomaly detection sub models and the input data.

* * * * *